(12) United States Patent
Kun et al.

(10) Patent No.: US 12,235,174 B2
(45) Date of Patent: Feb. 25, 2025

(54) PRESSURE SENSOR

(71) Applicant: Peratech IP Ltd., North Yorkshire (GB)

(72) Inventors: Sun Kun, Jiansu (CN); Xu Feng, Jiansu (CN)

(73) Assignee: Peratech IP Ltd, North Yorkshire (GB)

( * ) Notice: Subject to any disclaimer, the term of this patent is extended or adjusted under 35 U.S.C. 154(b) by 11 days.

(21) Appl. No.: 17/920,823

(22) PCT Filed: Jun. 24, 2021

(86) PCT No.: PCT/GB2021/000075
§ 371 (c)(1),
(2) Date: Oct. 24, 2022

(87) PCT Pub. No.: WO2022/038330
PCT Pub. Date: Feb. 24, 2022

(65) Prior Publication Data
US 2023/0160763 A1    May 25, 2023

(30) Foreign Application Priority Data

Apr. 24, 2020    (CN) .......................... 202020671744.7

(51) Int. Cl.
*G01L 1/22*    (2006.01)
*G06F 3/02*    (2006.01)
(Continued)

(52) U.S. Cl.
CPC .............. *G01L 1/22* (2013.01); *G06F 3/0202* (2013.01); *G06F 3/023* (2013.01); *H01C 10/106* (2013.01); *H01H 13/14* (2013.01)

(58) Field of Classification Search
CPC ... G01L 1/22; G01L 1/205; G01L 1/18; G06F 3/0202; H01C 10/106; H01H 13/14
See application file for complete search history.

(56) References Cited

U.S. PATENT DOCUMENTS 6,351,205 B1    2/2002    Armstrong
6,531,951 B2 *  3/2003    Serban .................... G01L 1/205
                                                          338/47
(Continued)

OTHER PUBLICATIONS

International Search Report cited in PCT/GB2021/000075, mailed Jan. 17, 2022, 3 pages.
(Continued)

*Primary Examiner* — Edwin A. Leon
(74) *Attorney, Agent, or Firm* — Cooper Legal Group LLC

(57) ABSTRACT

A pressure sensor has a base layer, a supporting structure arranged on the base layer, and an elastic layer disposed above the base layer and the supporting structure. The elastic layer has a curved lower surface that is recessed away from the base layer. The curved lower surface, the supporting structure and the base layer define a cavity with an arched top wall. A first electrode, a second electrode, and an elastic body are all arranged within the cavity, such that when the elastic layer is elastically deformed in a direction of the base layer, the variable resistance elastic body electrically connects the first electrode with the second electrode, so as to generate a first signal related to the elastic deformation of the variable resistance elastic body.

11 Claims, 11 Drawing Sheets

(51) Int. Cl.
*G06F 3/023* (2006.01)
*H01C 10/10* (2006.01)
*H01H 13/14* (2006.01)

(56) References Cited

U.S. PATENT DOCUMENTS

| | | | | |
|---|---|---|---|---|
| 8,766,125 B2* | 7/2014 | Chou | ................... | H01H 13/702 |
| | | | | 200/512 |
| 9,111,703 B2* | 8/2015 | Whitt, III | ............... | G06F 1/1669 |
| 10,359,326 B2* | 7/2019 | Toyoshima | ............. | G01L 1/205 |
| 2004/0000195 A1* | 1/2004 | Yanai | ..................... | A61B 5/113 |
| | | | | 73/717 |
| 2016/0363491 A1 | 12/2016 | Iwase et al. | | |

OTHER PUBLICATIONS

Written Opinion cited in PCT/GB2021/000075, mailed Jan. 17, 2022, 7 pages.

* cited by examiner

PRESSURE SENSOR

CROSS REFERENCE TO RELATED APPLICATIONS

This application claims priority from Chinese Utility Model number 2020 20671744.7, filed on 24 Apr. 2020, the whole contents of which are incorporated herein by reference.

BACKGROUND OF THE INVENTION

The present invention relates to a pressure sensor, and a key structure including a pressure sensor.

Existing pressure sensors are generally made of polymers and flexible substrates. However, after the pressure is removed, the response speed is slow due to the viscoelasticity of the polymers and flexible substrates, and it takes a certain time to return to the original position. Obvious creep and hysteresis are generated, and therefore, the sensitivity and the reliability of the pressure sensor are low.

BRIEF SUMMARY OF THE INVENTION

According to a first aspect of the present invention, there is provided a pressure sensor, characterized in that it comprises: a base layer, a supporting structure arranged on the base layer, an elastic layer disposed above the base layer and the supporting structure, having a curved lower surface that is recessed away from the base layer, wherein the curved lower surface, the supporting structure and the base layer define a cavity with an arched top wall, a first electrode, a second electrode, and an elastic body, all arranged within the cavity, such that when the elastic layer is elastically deformed in the direction of the base layer, the elastic body electrically connects the first electrode with the second electrode, so as to generate a first signal related to the elastic deformation of the elastic body.

By designing the elastic layer in the pressure sensor to be curved in the direction away from the base layer, the stiffness of the elastic layer can be increased, thereby solving the problem that the existing pressure sensor needs a certain time after the pressure is removed. The problem of low sensitivity and reliability brought about by restoring to the original position improves the efficiency of elastic layer rebound, thereby improving the sensitivity and reliability of the pressure sensor.

According to a second aspect of the present invention, there is provided a button structure comprising a pressure sensor of the aforementioned type and a pressing mechanism, said pressing mechanism comprising a pressing portion arranged above the elastic layer and above the cavity, wherein the pressing portion is configured to be depressed by manual action, such that the pressing portion engages with the elastic layer to move it towards the base layer.

According to a third aspect of the present invention, there is provided an apparatus comprising either a pressure sensor or a button structure of the aforementioned type, and a processor connected to the electrodes of the pressure sensor, wherein the processor is configured to generate the first signal related to the amount of elastic deformation of the elastic body when the electrodes are connected through the elastic body.

According to a fourth aspect of the present invention, there is provided a method of generating a key press signal, comprising the steps of: obtaining a pressure sensor comprising a base layer, a supporting structure arranged on the base layer, an elastic layer disposed above the base layer and the supporting structure, having a curved lower surface that is recessed away from the base layer, wherein the curved lower surface, the supporting structure and the base layer define a cavity with an arched top wall, and a first electrode, a second electrode, and a variable resistance elastic body, all arranged within the cavity; applying a force to the elastic layer to move the elastic layer towards the base layer; compressing the variable resistance elastic body in response to the force; and contacting the first and second electrodes to generate a signal in response to elastic deformation of the variable resistance elastic body.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

Figure 1:
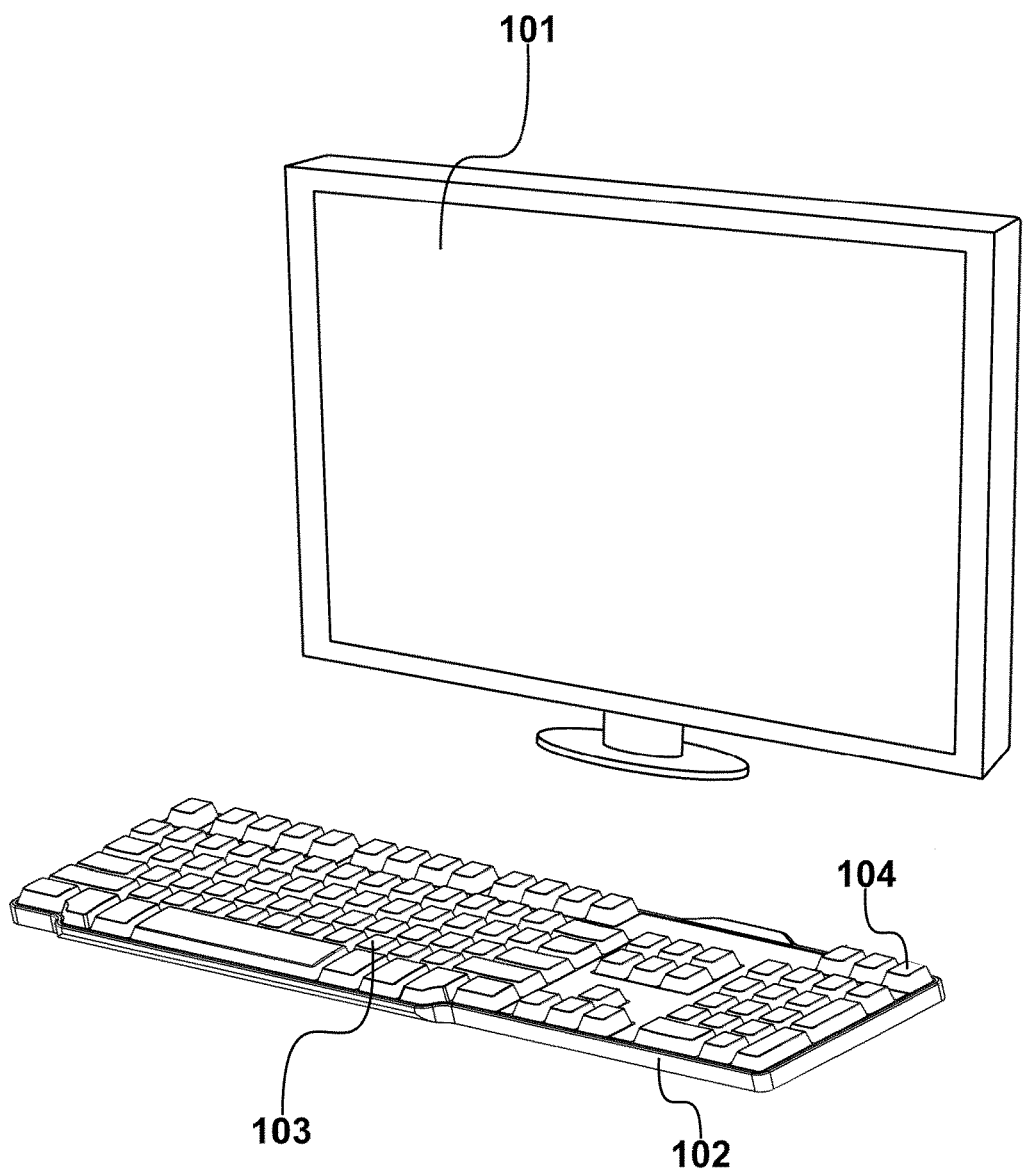
FIG. 1 illustrates a computer and keyboard in which the invention may be deployed.

FIG. 1 illustrates an environment in which the invention described herein may be deployed. A computer 101 is wirelessly connected to a keyboard 102. Manual input is provided to computer 101 by operation of keys indicated generally at 103, including key 104, on keyboard 102.

Many different designs of keyboard are available, which may connect wirelessly or using a wire. Alternatively, a keyboard may be integral to a computer, such as a laptop computer. The invention described herein may be used for any type of keyboard. It may also be used for any other type of input device that requires depression of a button, or any other pressure sensor application. For example, a device that uses a pressure sensor such as a scale body.

FIG. 2

Figure 2:
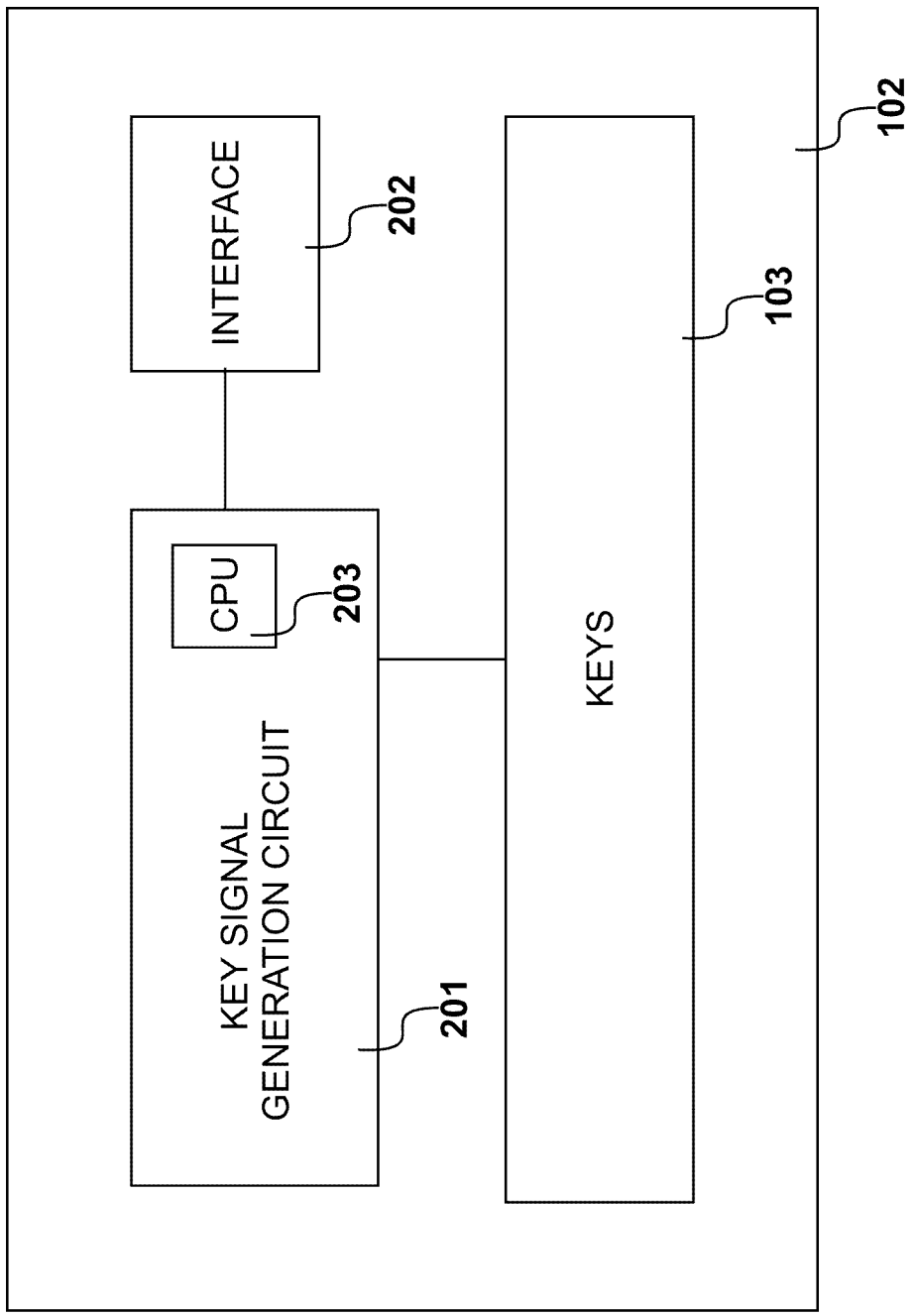
FIG. 2 is a diagram of the keyboard shown in FIG. 1.

A simplified block diagram of keyboard 102 is shown in FIG. 2. Keyboard 102 includes a number of keys 103. A key signal generation circuit 201 connects to keys 103 and also to an interface 202, which in this example is a wireless interface.

Circuit 201 receives electrical signals from keys 103 and generates key signals for provision to computer 101 via interface 202. Any circuit or alternative electronics that provides this functionality could be used. In this example, circuit 201 includes a processor, provided by CPU 203, and a number of further components not shown here.

FIG. 3

Figure 3:
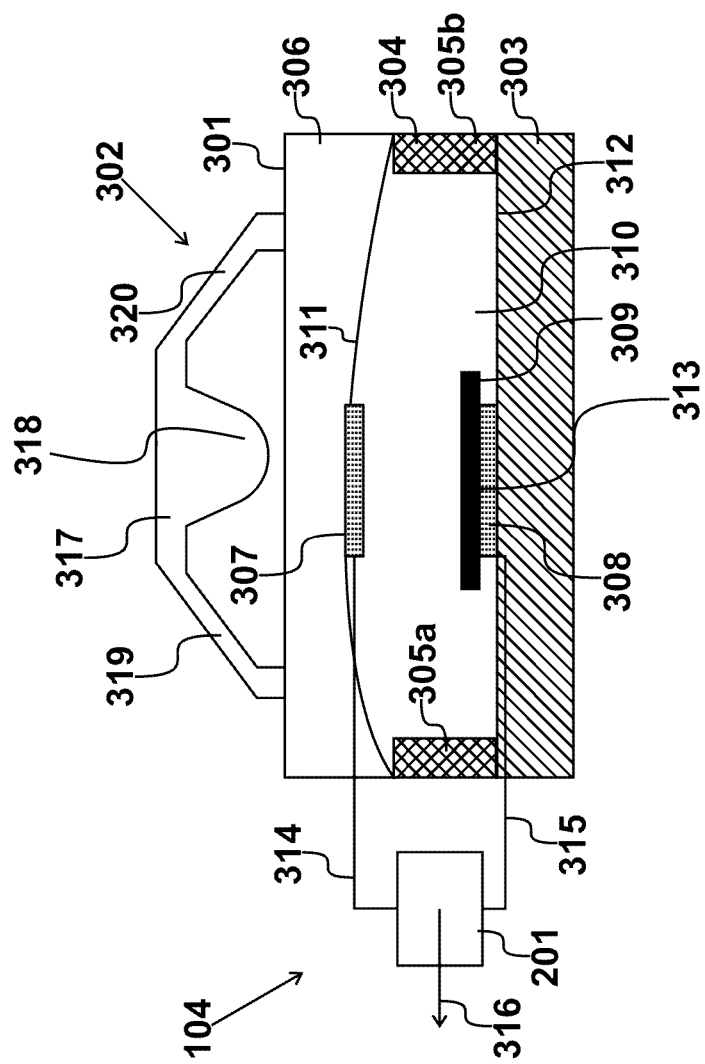
FIG. 3 is a diagrammatical cross section of a key shown in FIG. 1.

FIG. 3 is a cross section of key 104. Other keys 103 are similar, though may be of a different size and shape. Key 104 is an embodiment of a button structure according to the invention herein described, comprising a pressure sensor 301 and a pressing mechanism 302. Connections to key signal generation circuit 201 are shown diagrammatically.

Pressure sensor 301 includes a base layer 303, a support structure 304 provided by two supports 305a and 305b, an elastic layer 306, an upper electrode 307, a lower electrode 308, and a variable resistance elastic body 309. The two supports 305a and 305b are arranged on the base layer 303 at intervals, and elastic layer 306 covers and is in contact with support structure 304. Thus, support structure 304 and elastic layer 306 define a cavity 310 on base layer 303.

Elastic layer 306 has a lower surface 311 that is curved, with a concave curvature with respect to base layer 303. Cavity 310 therefore has an arched top provided by surface 311.

In other embodiments, the support structure may comprise only one or more than two supports, and the supports may be arranged in any suitable way that creates a cavity on the base layer. The supports may be made of rubber or other elastic material, or may be a structure that fixedly connects the elastic layer and the base layer. A layer of glue may be used, to support the elastic layer at a certain distance from the base layer to form the cavity.

Upper electrode 307 is arranged on the lower surface 311 of elastic layer 306. Lower electrode 308 is arranged on the upper surface 312 of base layer 303, opposite upper electrode 307. Both are located within cavity 310. Variable resistance elastic body 309 is disposed on the upper surface 313 of lower electrode 308, and therefore opposite upper electrode 307 and within cavity 310.

Upper electrode 307 is connected to circuit 201 by connection 314, and lower electrode 308 is connected to circuit 201 by connection 315. It will be understood that all the keys 103 are connected to circuit 201, and that this may be done using any suitable number of connections.

The material of variable resistance elastic body 309 is an elastomer. In this example it is a carbon-based quantum tunnelling composite such as that sold by the applicant Peratech Holdco Limited under the name QTC®, although it may be any carbon-based polymer material, for example, graphene. The elastic matrix of this material is an insulator in its normal form, and under compression or elastic deformation, it transforms from an insulator to a conductor. When it electrically connects two electrodes in this way, the resistance of the elastic body is related to the magnitude of the force applied, or the amount of elastic deformation it experiences.

The principle by which the material of elastic body 309 produces conductivity can be called the field-induced quantum tunnelling phenomenon, as follows: the metal particles in the material are very tightly distributed in the matrix under normal conditions, but there is no contact between them. When the material is pressed or deformed, the distance between the metal particles is reduced to the point where electrons can be transferred between the metal particles, thereby becoming conductive.

Pressing mechanism 302 includes a pressing portion 317, an abutment portion 318 and two support portions 319 and 320. the upper ends of the two support portions 319 and 320 are connected to the lower surface of pressing portion 317 at intervals, and their lower ends are respectively arranged on opposite sides of cavity 310. Abutment portion 318 is disposed on the lower surface of pressing portion 317 and is located between the two supporting portions 319 and 320, and abutment portion 318 is opposite to cavity 310 for pressing elastic layer 306 into the cavity.

In use, pressure is applied to the top of pressure sensor 301 using pressing mechanism 302. In other embodiments in which pressing mechanism is absent, pressure may be applied directly to elastic layer 306. Alternative pressing mechanisms may also be used. Elastic layer 306 undergoes elastic deformation to compress the space in cavity 310, and then elastic body 309 is compressed and deformed elastically between the two electrodes 307 and 308. When electrodes 307 and 308 are turned on, a connection is made between the electrodes via elastic body 309, which is sensed by circuit 201. Processor 203 generates a key signal 316, which is output to computer 101 via interface 202. Key signal 316 is related to the amount of deformation of elastic body 309.

Due to the different pressure or elastic deformation of the elastic substrate, the resistance value is different, and the generated key signal is also different, so that the adjustment of the force change of the key can be realized.

Since the lower surface 311 of elastic layer 306 is concave relative to base layer 303, the rigidity of layer 306 can be increased under the condition that the starting force is considered, and the problem that the base material of the elastic layer cannot rebound in time after a touch is solved.

A pressure sensor of this type can have an elastic layer with an increased stiffness, by designing the elastic layer in the pressure sensor to be concave in the direction away from the base layer. This solves the problem that known pressure sensors need a certain time to recover after the pressure is removed. In the invention described herein, the rebound efficiency of the elastic layer is improved, thereby improving the sensitivity and reliability of the pressure sensor.

Various alternative embodiments of the pressure sensor are envisaged, some of which are described with reference to FIGS. 5 to 11, all of which may be used with or without a pressing mechanism similar to mechanism 302 or any other pressing mechanism. In each embodiment, the electrodes can be connected to a circuit such as circuit 201 in order to generate the key signal, but these connections are not shown.

FIG. 4

Figure 4:
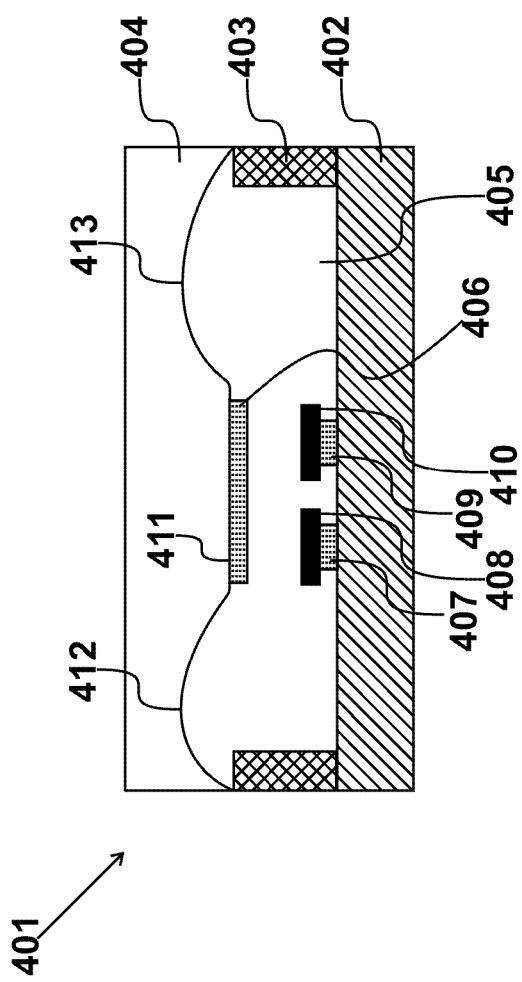
FIG. 4 is a cross section of a second embodiment of a pressure sensor.

A second embodiment of the invention herein described is shown in FIG. 4. Similarly to pressure sensor 301, pressure sensor 401 has a base layer 402, support structure 403, and elastic layer 404, defining a cavity 405 in which electrodes are arranged. Upper electrode 406 is arranged on the lower surface of elastic layer 404. Arranged in cavity 405 on the upper surface of base layer 402 are a first lower electrode 407 and second lower electrode 408. First elastic body 409 is arranged in cavity 405 on the upper surface of first lower electrode 407, and second elastic body 410 is arranged in cavity 405 on the upper surface of second lower electrode 408.

The lower surface 411 of elastic layer 404 defines two arches 412 and 413. Upper electrode 406 is arranged at the surface where the two arches 412 and 413 meet. This achieves the effect of increasing the rebound stiffness of the elastic layer.

In use, pressure sensor 401 works in the same way as pressure sensor 301 to generate a key signal.

FIG. 5

Figure 5:
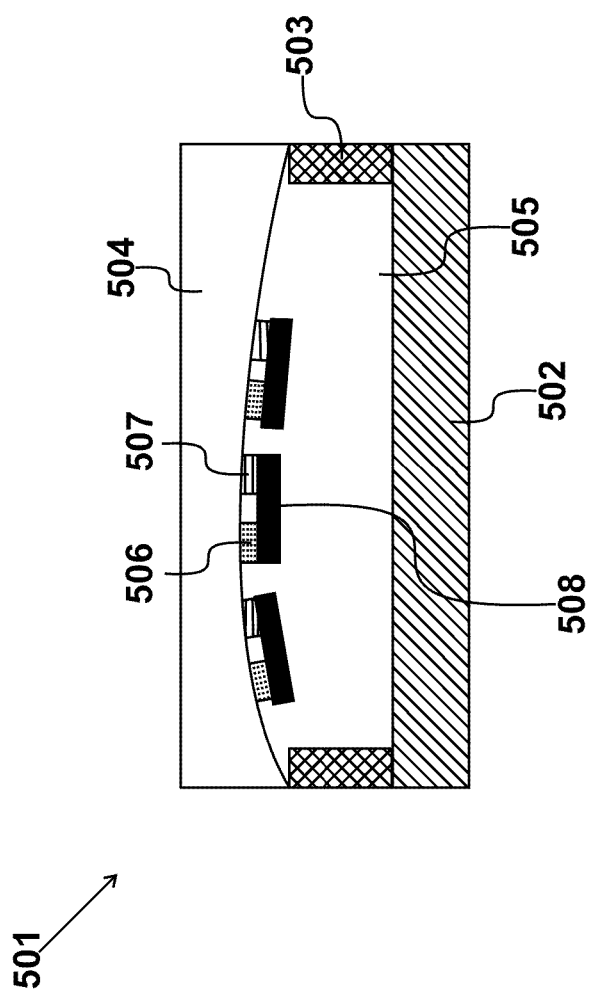
FIG. 5 is a cross section of a third embodiment of a pressure sensor.
Figure 6:
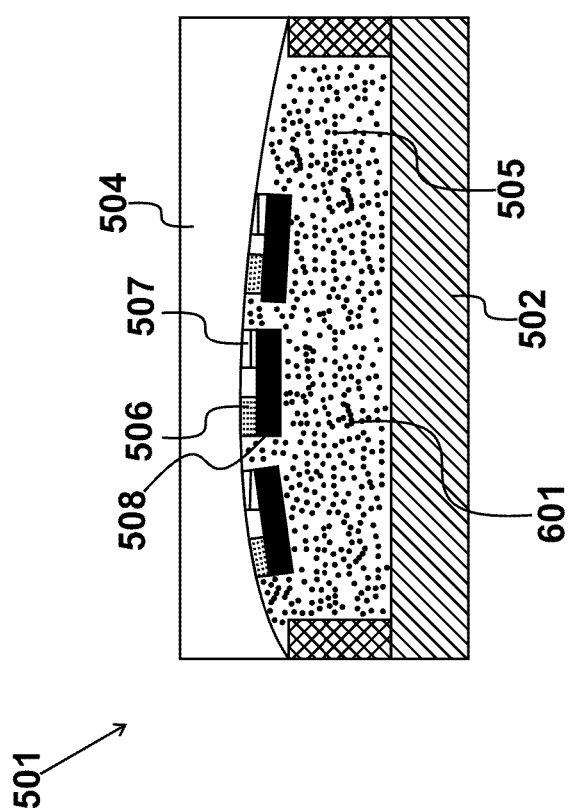
FIG. 6 shows the pressure sensor of FIG. 5 with an additional elastic sponge.

A third embodiment of the invention herein described is shown in FIG. 5. Similarly to pressure sensor 301, pressure sensor 501 has a base layer 502, support structure 503, and elastic layer 504 with a concave lower surface, defining a cavity 505. Electrodes are arranged in pairs in cavity 505 on the lower surface of elastic layer 504, each covered by an elastic body. For example, first electrode 506 and second electrode 507 are adjacent, and elastic body 508 is arranged on the lower surface of both electrodes. In this embodiment there are three such pairs of electrodes, but any suitable number could be used.

It has been described above that an elastic body of a carbon-based polymer material, such as elastic body 508, is an insulator in a normal form, and is transformed from an insulator to a conductive body under pressure or elastic deformation, such that two electrodes can be electrically connected through the body.

However, due to the difference in particle distribution in the material, elastic body 508 has a difference in longitudinal conductivity and lateral conductivity, which in turn makes the structure of first electrode 506 and second electrode 507 different. Elastic body 508 is used as the lateral conductivity.

In use, force is applied to the top of pressure sensor 501. Elastic layer 504 is pressed and flexed to drive the electrode pairs, such as electrodes 506 and 507, and elastic body 508, to move downwards towards base layer 502. Elastic body 508 contacts base layer 502 and is compressed, such that it undergoes elastic deformation and is converted from an insulator to a conductor. Electrodes 506 and 507 are thus connected, and the electron transfer path is from first electrode 506, via elastic body 508, to second electrode 507.

FIG. 6

As an addition to pressure sensor 501, there may be a resilient elastic sponge 601 filling cavity 505 and wrapping around each electrode pair and corresponding elastic body, such as electrodes 506 and 507 and elastic body 508.

In use, after pressure has been released on pressure sensor 501, elastic sponge 601 resiles back to its original state, thus pushing upwards on elastic layer 504 and assisting its restoration to its original position.

FIG. 7

Figure 7:
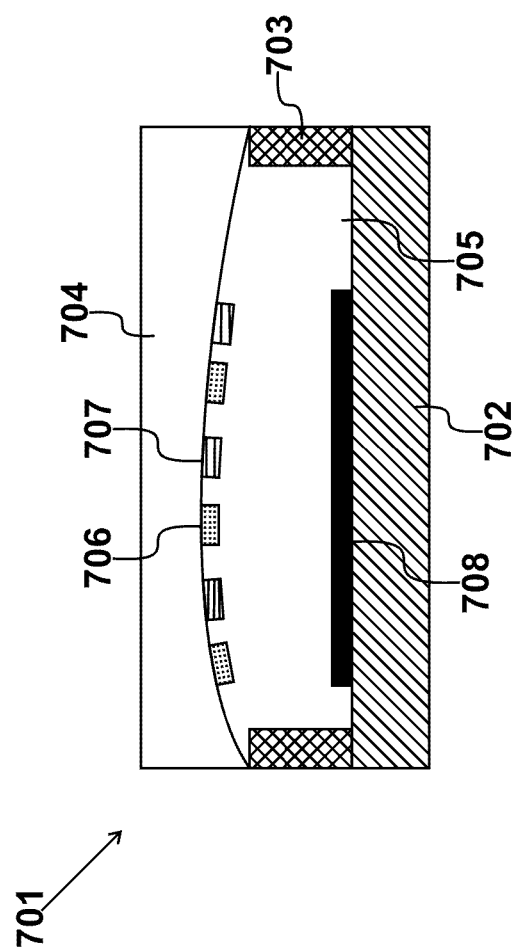
FIG. 7 is a cross section of a fourth embodiment of the invention.

A fourth embodiment of the invention herein described is shown in FIG. 7. Similarly to pressure sensor 501, pressure sensor 701 has a base layer 702, support structure 703, and elastic layer 704 with a concave lower surface, defining a cavity 705. Electrodes are arranged in pairs in cavity 705 on the lower surface of elastic layer 704. For example, first electrode 706 and second electrode 707 are adjacent. In this embodiment there are three such pairs of electrodes, but any suitable number could be used. A single elastic body 708 is arranged in cavity 705 on the top surface of base layer 702, and thus in this embodiment it is not arranged on any of the electrodes.

In use, force is applied to the top of pressure sensor 701. Elastic layer 704 is pressed and flexed to drive the electrode pairs, such as electrodes 706 and 707, to move downwards towards base layer 702. The electrodes contact elastic body 708 which is compressed, such that it undergoes elastic deformation and is converted from an insulator to a conductor. Electrodes 706 and 707 are thus connected, and the electron transfer path is from first electrode 706, via elastic body 708, to second electrode 707.

FIG. 8

Figure 8:
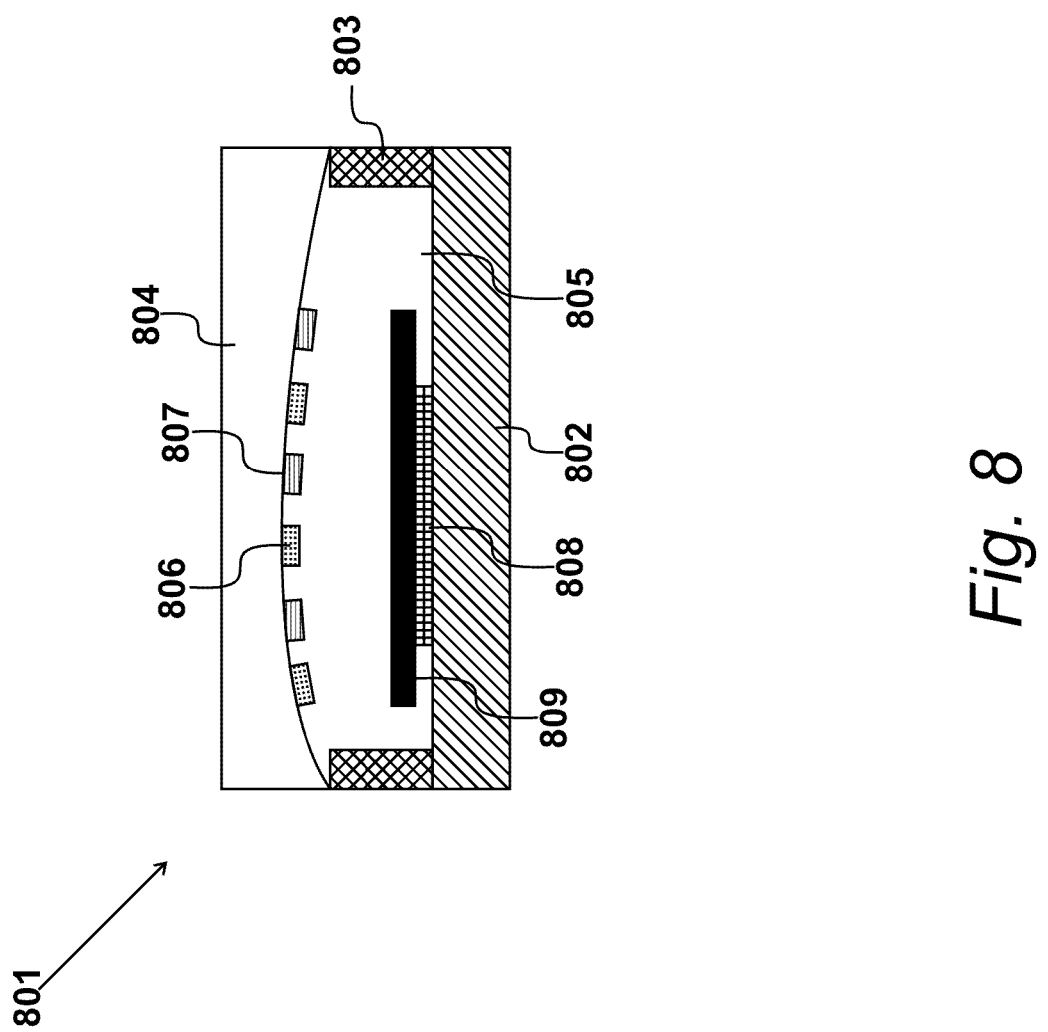
FIG. 8 is a cross section of a fifth embodiment of the invention.

A fifth embodiment of the invention herein described is shown in FIG. 8. Similarly to pressure sensor 701, pressure sensor 801 has a base layer 802, support structure 803, and elastic layer 804 with a concave lower surface, defining a cavity 805. Upper electrodes are arranged in pairs in cavity 805 on the lower surface of elastic layer 804. For example, first upper electrode 806 and second upper electrode 807 are adjacent. In this embodiment there are three such pairs of upper electrodes, but any suitable number could be used. A lower electrode 808 is arranged in cavity 805 on the top surface of base layer 802, opposite the upper electrodes, and an elastic body 809 is arranged in cavity 805 on the top surface of lower electrode 808.

In use, force is applied to the top of pressure sensor 801. Elastic layer 804 is pressed and flexed to drive the electrode pairs, such as electrodes 806 and 807, to move downwards towards base layer 802. The electrodes contact elastic body 809 which is compressed, such that it undergoes elastic deformation and is converted from an insulator to a conductor. Electrodes 806, 807 and 808 are thus connected, and the electron transfer path is from first upper electrode 806, via elastic body 809, to lower electrode 808, to second upper electrode 807.

FIG. 9

Figure 9:
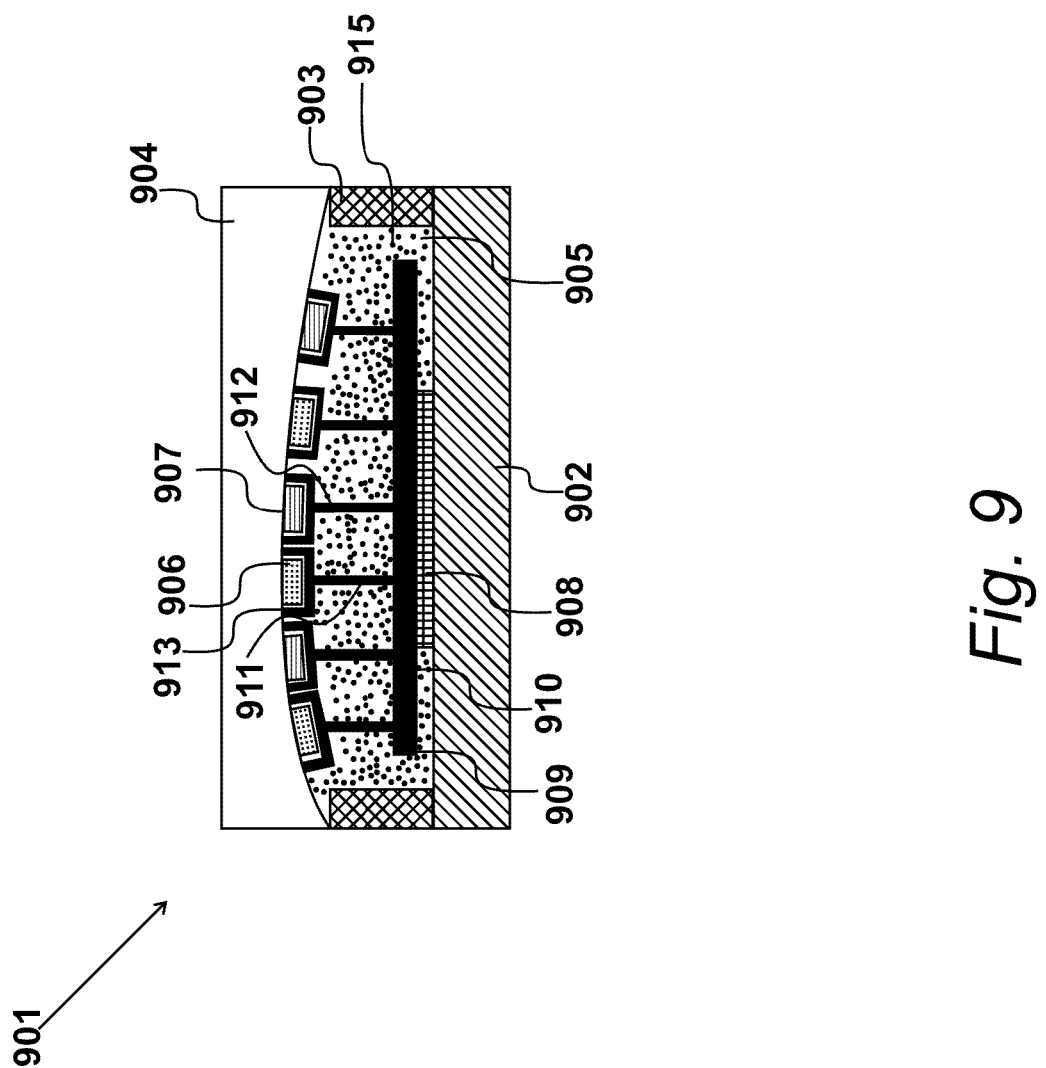
FIG. 9 is a cross section of a sixth embodiment of the invention.

A sixth embodiment of the invention herein described is shown in FIG. 9. Similarly to pressure sensor 801, pressure sensor 901 has a base layer 902, support structure 903, and elastic layer 904 with a concave lower surface, defining a cavity 905. Upper electrodes are arranged in pairs in cavity 905 on the lower surface of elastic layer 904. For example, first upper electrode 906 and second upper electrode 907 are adjacent. In this embodiment there are three such pairs of upper electrodes, but any suitable number could be used. A lower electrode 908 is arranged in cavity 905 on the top surface of base layer 902, opposite the upper electrodes.

In this embodiment an elastic body 909 is arranged in cavity 905 such that it can contact all the electrodes when force is applied to pressure sensor 901. Body 909 includes a horizonal elastic member 910 which is arranged on lower electrode 908. Upstanding from and integral with horizontal elastic member 910 are six vertical elastic members, such as vertical elastic members 911 and 912. The number of vertical elastic members is equal to the number of upper electrodes. Vertical elastic member 911 defines, at its top, a channel 913; the remaining vertical elastic members are similar. Channel 913 has a substantially U-shaped cross section to correspond with the shape of first upper electrode 906. First upper electrode 906 is arranged within channel 913 but is spaced away from the walls of the channel so that it is not in contact with elastic body 909 when pressure sensor is in its uncompressed form. The other upper electrodes are similarly each arranged within one of the channels.

A resilient elastic sponge 915 fills cavity 905 and wraps around elastic body 909.

In use, force is applied to the top of pressure sensor 901. Elastic layer 904 is pressed and flexed to drive the upper electrodes, such as electrodes 906 and 907, to move downwards towards base layer 902. The upper electrodes contact the bottom of their respective channel, for example electrode 906 contacts the bottom wall of channel 914. This compresses the bottom of each channel, each vertical elastic member, and horizontal elastic member 910. In this way the electrodes contact and compress elastic body 909, such that it undergoes elastic deformation and is converted from an insulator to a conductor. The upper and lower electrodes are thus connected, and a key signal can be generated.

After pressure has been released on pressure sensor 901, elastic sponge 915 resiles back to its original state, thus pushing upwards on elastic layer 904 and assisting its restoration to its original position, such that the electrodes are no longer connected to each other.

FIG. 10

Figure 10:
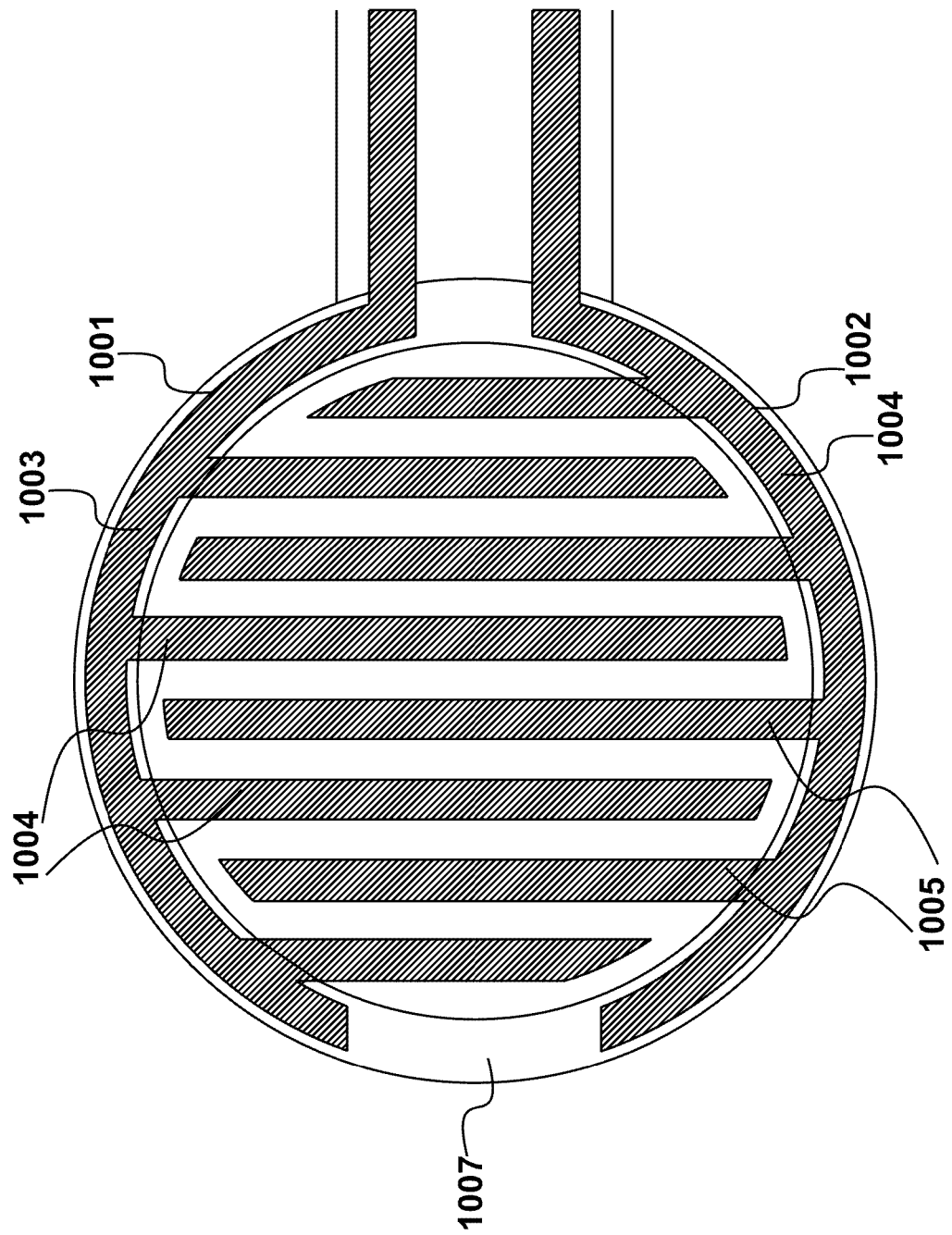
FIG. 10 shows an arrangement of electrodes.

FIG. 10 shows an arrangement of upper electrodes suitable for use in a pressure sensor, such as pressure sensor 501, 701, 801 or 901. In this embodiment, there are two upper electrode layers 1001 and 1002 arranged on the lower surface of an elastic layer 1007. Each electrode layer comprises a trunk conductive rod and a plurality of branch conductive strips.

Electrode layer 1001 comprises trunk conductive rod 1003 and a set 1004 of four branch conductive strips 1004. Similarly, electrode layer 1002 comprises trunk conductive rod 1005 and a set 1006 of four branch conductive strips that are attached to rod 1003 at one end. Trunk conductive rods 1003 and 1005 are opposite to each other, and the sets of branch conductive strips 1004 and 1006 are spaced apart from each other and arranged alternately, such that the strips are interdigitated.

Trunk conductive rods 1003 and 1005 are arc-shaped, such that the shape formed by the two electrode layers is substantially circular, with the branch conductive strips located within the circumference.

In each of pressure sensors 501, 701, 801 and 901, each electrode pair comprises one of branch conductive strips 1004 and one of branch conductive strips 1006.

FIG. 11

Figure 11:
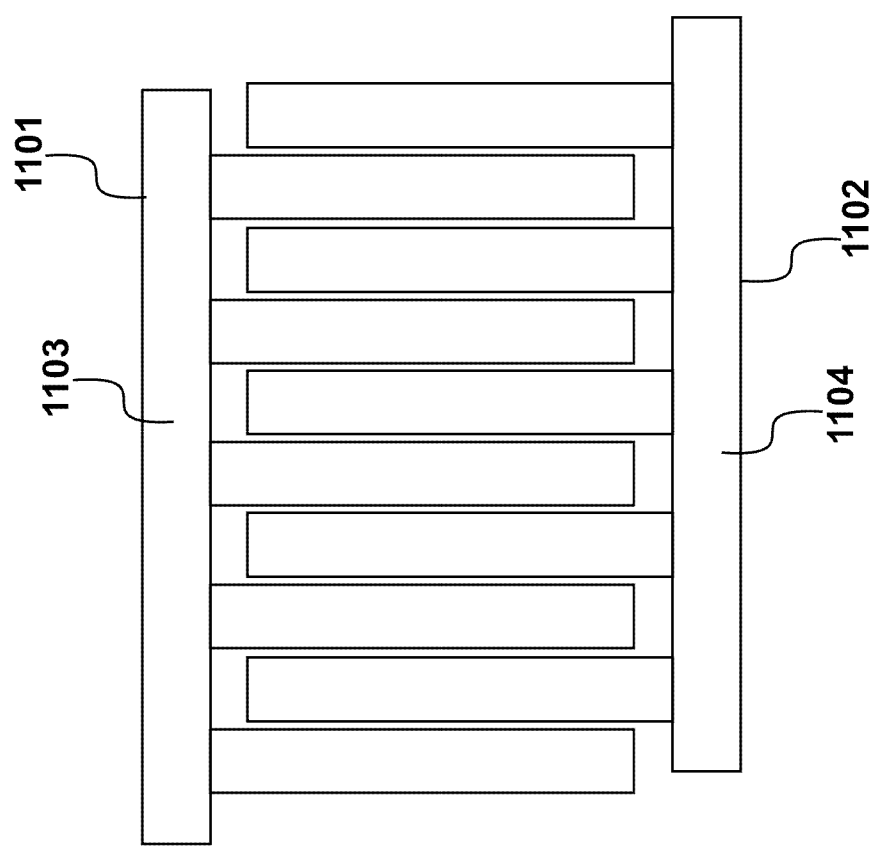
FIG. 11 shows an alternative arrangement of electrodes.

FIG. 11 shows an alternative arrangement of electrode layers 1101 and 1102. It is similar to the arrangement of FIG. 10 save that the trunk conductive rods 1103 and 1104 are rectangular and elongated, and arranged in parallel, rather than arced. The entire arrangement forms a rectangular or square shape.

In this description, it should be noted that the orientation or positional relationship indicated by the terms "within", "above", "below" and similar is based on the orientation or positional relationship shown in the drawings, or the way the product is usually placed when used. The orientation or positional relationship is only for the convenience of describing the application and simplifying the description, rather than indicating or implying that the device or element referred to must have a specific orientation or be constructed and operated in a specific orientation, and therefore cannot be construed as a limitation of the application.

It should also be noted that, unless otherwise clearly specified and limited, the terms "disposed", "arranged" and "connected" should be understood in a broad sense, for example, it can be a fixed connection, a detachable connection, or an integral connection; it can be a direct connection. The connection can also be indirectly connected through an intermediate medium, and it can be the internal communication between two components.

The invention claimed is:

1. A pressure sensor, comprising:
a base layer;
a supporting structure arranged on the base layer;
an elastic layer disposed above the base layer and the supporting structure, the elastic layer having a curved lower surface that is recessed away from the base layer, wherein the curved lower surface, the supporting structure and the base layer define a cavity with an arched top wall; and
a first electrode arranged on the curved lower surface of the elastic layer, a second electrode arranged on the curved lower surface of the elastic layer and spaced apart from the first electrode, and a variable resistance elastic body arranged on lower surfaces of the first electrode and the second electrode, wherein the first electrode, the second electrode, and the variable resistance elastic body are all arranged within the cavity such that when the elastic layer is elastically deformed in a direction of the base layer, the variable resistance elastic body electrically connects the first electrode with the second electrode, so as to generate a first signal related to the elastic deformation of the variable resistance elastic body.

2. The pressure sensor according to claim 1, further comprising an elastic sponge filling the cavity and wrapping around the first electrode, the second electrode, and the variable resistance elastic body.

3. A pressure sensor, comprising:
a base layer;
a supporting structure arranged on the base layer;
an elastic layer disposed above the base layer and the supporting structure, the elastic layer having a curved lower surface that is recessed away from the base layer, wherein the curved lower surface, the supporting structure and the base layer define a cavity with an arched top wall;
a first electrode arranged on the curved lower surface of the elastic layer, a second electrode, and a variable resistance elastic body, wherein the first electrode, the second electrode, and the variable resistance elastic body are all arranged within the cavity such that when the elastic layer is elastically deformed in a direction of the base layer, the variable resistance elastic body electrically connects the first electrode with the second electrode, so as to generate a first signal related to the elastic deformation of the variable resistance elastic body; and
a first electrode layer and a second electrode layer, wherein:
the first electrode layer comprises a plurality of first sub-electrodes, one of which is the first electrode, and the second electrode layer comprises a plurality of second sub-electrodes, one of which is the second electrode, the first sub-electrodes and the second sub-electrodes being alternately arranged on the curved lower surface of the elastic layer, and the variable resistance elastic body is disposed on the base layer, opposite to lower surfaces of all the first sub-electrodes and the second sub-electrodes.

4. The pressure sensor according to claim 3, further comprising a third electrode arranged on the base layer underneath the variable resistance elastic body, such that the variable resistance elastic body is arranged on a top surface of the third electrode.

5. The pressure sensor according to claim 3, further comprising an elastic sponge filling the cavity and wrapping the variable resistance elastic body, wherein:
the variable resistance elastic body comprises a horizontal elastic member and a plurality of vertical elastic members upstanding therefrom, the number of the vertical elastic members being equal to the number of first sub-electrodes and the second sub-electrodes combined;
each of the vertical elastic members defines, at a top of the vertical elastic member, a channel having a U-shaped cross section; and
each of the first sub-electrodes and the second sub-electrodes is disposed within the channel of one of the vertical elastic members, such that the first sub-electrode or the second sub-electrode is spaced from walls of the channel.

6. The pressure sensor according to claim 3, wherein:
the first electrode layer comprises a first trunk conductive rod, and a plurality of first branch conductive strips forming the first sub-electrodes; and
the second electrode layer comprises a second trunk conductive rod, and a plurality of second branch conductive strips forming the second sub-electrodes;
the first trunk conductive rod and the second trunk conductive rod are arranged opposite to each other;
the plurality of first branch conductive strips and the plurality of second branch conductive strips are arranged alternately and located between the first trunk conductive rod and the second trunk conductive rod; and
an end of each first branch conductive strip is connected to the first trunk conductive rod, and an end of each second branch conductive strip is connected to the second trunk conductive rod.

7. The button structure, comprising a pressure sensor according to claim 1 and a pressing mechanism, the pressing mechanism comprising a pressing portion arranged above the elastic layer and above the cavity, wherein the pressing portion is configured to be depressed by manual action, such that the pressing portion engages with the elastic layer to move the elastic layer towards the base layer.

8. The button structure according to claim 7, wherein the pressing portion has an abutting portion provided on a lower surface of the pressing portion to engage with the elastic layer;

the pressing mechanism further comprises at least one elastic supporting portion; and
an upper end of the at least one elastic supporting portion is connected to the lower surface of the pressing portion, and a lower end of the at least one elastic supporting portion is arranged on the elastic layer.

9. An apparatus comprising:
the pressure sensor according to claim 1; and
a processor connected to the first electrode and the second electrode of the pressure sensor, wherein the processor is configured to generate the first signal related to an amount of the elastic deformation of the variable resistance elastic body when the first electrode and the second electrode are connected through the variable resistance elastic body.

10. A method of generating a key press signal, comprising the steps of:
obtaining a pressure sensor comprising a base layer, a supporting structure arranged on the base layer, an elastic layer disposed above the base layer and the supporting structure, the elastic layer having a curved lower surface that is recessed away from the base layer, wherein the curved lower surface, the supporting structure and the base layer define a cavity with an arched top wall, and a first electrode arranged on the curved lower surface of the elastic layer, a second electrode arranged on the curved lower surface of the elastic layer and spaced apart from the first electrode, and a variable resistance elastic body arranged on lower surfaces of the first electrode and the second electrode, wherein the first electrode, the second electrode, and the variable resistance elastic body are all arranged within the cavity;
applying a force to the elastic layer to move the elastic layer towards the base layer;
compressing the variable resistance elastic body in response to the force; and
contacting the first electrode and the second electrode to generate a signal in response to elastic deformation of the variable resistance elastic body.

11. An apparatus comprising:
the button structure according to claim 7; and
a processor connected to the first electrode and the second electrode of the pressure sensor, wherein the processor is configured to generate the first signal related to an amount of the elastic deformation of the variable resistance elastic body when the first electrode and the second electrode are connected through the variable resistance elastic body.

* * * * *